(12) United States Patent
Li et al.

(10) Patent No.: US 11,863,313 B2
(45) Date of Patent: Jan. 2, 2024

(54) DATA TRANSMISSION METHOD, BASE STATION, USER EQUIPMENT, AND SYSTEM

(71) Applicant: ZTE Corporation, Guangdong (CN)

(72) Inventors: Xincai Li, Guangdong (CN); Yajun Zhao, Guangdong (CN); Ling Yang, Guangdong (CN); Hanqing Xu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 25 days.

(21) Appl. No.: 17/353,465

(22) Filed: Jun. 21, 2021

(65) Prior Publication Data

US 2021/0314083 A1   Oct. 7, 2021

Related U.S. Application Data

(63) Continuation of application No. 16/347,380, filed as application No. PCT/CN2017/107368 on Oct. 23, 2017, now Pat. No. 11,044,038.

(30) Foreign Application Priority Data

Nov. 4, 2016   (CN) .......................... 201610966244.4

(51) Int. Cl.
*H04W 72/04*   (2023.01)
*H04L 1/00*   (2006.01)
(Continued)

(52) U.S. Cl.
CPC .......... *H04L 1/0006* (2013.01); *H04L 5/0007* (2013.01); *H04L 5/0055* (2013.01);
(Continued)

(58) Field of Classification Search
CPC ... H04L 1/0006; H04L 1/1887; H04L 5/0007; H04L 5/0055; H04L 5/0091;
(Continued)

(56) References Cited

U.S. PATENT DOCUMENTS

| 8,982,892 B2 | 3/2015 | Gan et al. |
| 9,722,760 B2 | 8/2017 | Stern-Berkowitz et al. |

(Continued)

FOREIGN PATENT DOCUMENTS

| CN | 101399628 A | 4/2009 |
| CN | 103687007 A | 3/2014 |

(Continued)

OTHER PUBLICATIONS

Fujitsu, "Discussion on flexible/dynamic TDD," 3GPP TSG RAN WG1 Meeting #86bis, R1-1608805, Lisbon, Portugal, Oct. 10-14, 2016, 5 pages.

(Continued)

*Primary Examiner* — Phuc H Tran
(74) *Attorney, Agent, or Firm* — Perkins Coie LLP (57) ABSTRACT

The present invention provides a data transmission method, a base station, a user equipment, and a system. The method includes: adjusting and determining a frame structure of each time unit within a preset duration; notifying a user equipment (UE) of the adjusted frame structure; and performing data transmission according to the adjusted frame structure.

20 Claims, 4 Drawing Sheets

(51) Int. Cl.
*H04L 5/00* (2006.01)
*H04W 72/0446* (2023.01)
*H04W 80/08* (2009.01)
*H04W 72/30* (2023.01)

(52) U.S. Cl.
CPC ....... *H04W 72/0446* (2013.01); *H04W 72/30* (2023.01); *H04W 80/08* (2013.01)

(58) Field of Classification Search
CPC .............. H04L 5/1469; H04W 72/005; H04W 72/0446; H04W 72/10; H04W 80/08; H04W 72/0406
See application file for complete search history.

(56) References Cited

U.S. PATENT DOCUMENTS

| | | |
|---|---|---|
| 2011/0317597 A1 | 12/2011 | Wan et al. |
| 2012/0230273 A1* | 9/2012 | He .................... H04W 56/0045 370/328 |
| 2016/0020893 A1 | 1/2016 | Tong et al. |
| 2016/0080133 A1 | 3/2016 | Golitschek Edler Von Elbwart et al. |
| 2016/0183232 A1* | 6/2016 | Stirling-Gallacher ....................... H04L 5/0092 370/280 |
| 2016/0255639 A1* | 9/2016 | Chen .................... H04W 72/082 370/336 |
| 2017/0171844 A1 | 6/2017 | Suzuki et al. |
| 2018/0132237 A1 | 5/2018 | Sundararajan et al. |
| 2018/0279350 A1* | 9/2018 | Jiang ................. H04W 52/0225 |

FOREIGN PATENT DOCUMENTS

| | | |
|---|---|---|
| CN | 104105203 A | 10/2014 |
| CN | 104854811 A | 8/2015 |
| EP | 2802091 A1 | 11/2014 |
| JP | 2013-098834 A | 5/2013 |
| JP | 2016-518087 A | 6/2016 |
| WO | 2012139441 A1 | 10/2012 |

OTHER PUBLICATIONS

Huawei et al., "Support of URLLC for TDD," 3GPP TSG RAN WG1 Meeting #90bis, R1-1717082, Prague, Czech Republic, Oct. 9-13, 2017, 11 pages.

Huawei et al. "Dynamic and semi-static DL/UL resource partition," 3GPP TSG RAN WG1 Meeting #90bis, R1-1717065, Prague, Czech Republic, Oct. 9-13, 2017, 7 pages.
CATT, "NR frame structure for multiplexing of URLLC and eMBB traffic," 3GPP TSG RAN WG1 #86bis, R1-1608764, Lisbon, Portugal, Oct. 10-14, 2016, 3 pages.
Samsung, "Signaling of Slot Structure," 3GPP TSG RAN WG1 #86bis, R1-1609127, Lisbon, Portugal, Oct. 10-14, 2016, 3 pages.
Intel Corporation, "On URLLC mini-slot structure," 3GPP TSG RAN WG1 Meeting #86bis, R1-1609510, Lisbon, Portugal, Oct. 10-14, 2016, 5 pages.
Ericsson, "On dynamic TDD," TSG-RAN WG1 #86bis, R1-1609628, Lisbon, Portugal, Oct. 10-14, 2016, 2 pages.
3GPP TS 51.010-1, V9.2.0, Jun. 2010, Technical Specification, "3rd Generation Partnership Project; Technical Specification Group, GSM/EDGE Radio Access Network; Digital cellular telecommunications system (Phase 2+); Mobile Station (MS) conformance specification; Part 1: Conformance specification, (Release 9)," 5250 pages.
International Search Report and Written Opinion for International Patent Application No. PCT/CN2017/107368, dated Dec. 29, 2017, 6 pages.
ZTE et al., R1-1608957, URLLC and eMBB Frame Structure and Multiplexing. 3GPP TSG-RAN WG1 Meeting #86bis, May 11, 2016, section 2, 7 pages.
Extended European Search Report of corresponding European Patent Application No. 17868352.0—8 pages (dated Jun. 4, 2020).
NTT Docomo, Inc., "Mechanisms for dynamic Tdd", 3GPP TSG RAN WG1 Meeting #86bis, R 1-1610085—5 pages (2016).
European Communication under Rule 71(3) EPC issued in EP Patent Application No. 17868352.0, dated Mar. 1, 2023, 43 pages.
Chinese office action issued in CN Patent Application No. 201610966244.4, dated Jun. 24, 2021, 22 pages. English translation included.
Chinese Notification to Grant Patent Right for Invention issued in CN Patent Application No. 201610966244.4, dated Jan. 25, 2022, 4 pages. English translation included.
Japanese office action issued in JP Patent Application No. 2019-522943, dated Jul. 7, 2020, 7 pages. English translation included.
Japanese office action issued in JP Patent Application No. 2019-522943, dated Apr. 6, 2021, 5 pages. English translation included.
Japanese Decision of Patent issued in JP Patent Application No. 2019-522943, dated Nov. 2, 2021, 5 pages. English translation included.

* cited by examiner

DATA TRANSMISSION METHOD, BASE STATION, USER EQUIPMENT, AND SYSTEM

CROSS-REFERENCE TO RELATED APPLICATIONS

This is a continuation of U.S. patent application Ser. No. 16/347,380, filed on May 3, 2019, which is a National Phase Application, filed under 35 U.S.C. 371, of International Patent Application No. PCT/CN2017/107368, filed on Oct. 23, 2017, which claims priority to Chinese patent application No. 201610966244.4 filed on Nov. 4, 2016, contents of each of which are incorporated herein by reference in their entireties.

TECHNICAL FIELD

The present invention relates to transmission management technologies in the field of communications and, in particular, to a data transmission method, a base station, a user equipment, and a system.

BACKGROUND

The 5G (5th Generation) needs to solve some challenges posed by diverse application scenarios. For example, low-delay applications have high requirements on the delay and need to provide users with a millisecond-level end-to-end delay. At the same time, in order to implement forward compatibility in 5G communication, the support to service adaptation is an inevitable trend. The service adaptation refers to allowing semi-static or dynamic configuration in uplink and downlink configuration, so as to meet service load requirements or match the change of service load. Therefore, how to support or implement flexible duplex or dynamic time division duplexing (TDD) has not yet been proposed in the discussion of the third generation partnership project (3GPP) standard.

SUMMARY

A summary of the subject matter is described hereinafter in detail. This summary is not intended to limit the scope of the claims.

The present invention provides a data transmission method, a base station, a user equipment, and a system.

A data transmission method is provided in the embodiments of the present invention. The method includes the steps described below.

A frame structure of each time unit within a preset duration is adjusted and determined.

The adjusted frame structure is notified to a user equipment (UE).

Data transmission is performed according to the adjusted frame structure.

A data transmission method is provided in the embodiments of the present invention. The method includes the steps described below.

An adjusted frame structure sent by a base station is received.

Data transmission is performed according to the adjusted frame structure.

A base station is provided in the embodiments of the present invention. The base station includes a control unit and a communication unit.

The control unit is configured to adjust and determine a frame structure of each time unit within a preset duration.

The communication unit is configured to notify a UE of the adjusted frame structure; and perform data transmission according to the adjusted frame structure.

A UE is provided in the embodiments of the present invention. The UE includes a receiving unit and a sending unit.

The receiving unit is configured to receive an adjusted frame structure sent by a base station.

The sending unit is configured to perform data transmission according to the adjusted frame structure.

A data transmission system is provided in the embodiments of the present invention. The system includes a base station and a UE.

The base station is configured to adjust and determine a frame structure of each time unit within a preset duration, notify a UE of the adjusted frame structure, and perform data transmission according to the adjusted frame structure.

The UE is configured to receive the adjusted frame structure sent by the base station, and perform the data transmission according to the adjusted frame structure.

A base station is provided in the embodiments of the present invention. The base station includes a storage medium and a processor.

The storage medium includes a group of instructions that, when executed, cause the processor to perform the included operations described below.

A frame structure of each time unit within a preset duration is adjusted and determined.

The adjusted frame structure is notified to a UE.

Data transmission is performed according to the adjusted frame structure.

A UE is provided in the embodiments of the present invention. The UE includes a storage medium and a processor.

The storage medium includes a group of instructions that, when executed, cause the processor to perform the included operations described below.

An adjusted frame structure sent by a base station is received, and data transmission is performed according to the adjusted frame structure.

A computer-readable storage medium is further provided in the embodiments of the present invention, and is configured to store computer-executable instructions which, when executed by a processor, implement any one of the above-mentioned methods.

A data transmission method, a base station, a user equipment, and a system are provided in the embodiments of the present invention. The base station side can flexibly adjust the frame structure of each time unit within the preset duration and send the adjusted frame structure to the UE, so that the data transmission can be performed between the base station and the UE according to the adjusted frame structure. Therefore, dynamic transmission of uplink and downlink data according to service requirements is implemented.

Other aspects can be understood after the drawings and detailed description are read and understood.

DETAILED DESCRIPTION

The processes of scheduling and hybrid automatic repeat request (HARQ) caused by dynamic change of uplink and downlink transmission should also be considered. For example, the base station sends downlink control information (DCI) in a slot 1 to schedule a slot 3 and a slot 4 for uplink data transmission. Nevertheless, when downlink data with a higher priority, such as a data packet of a downlink high-reliability ultra-low-latency communication ultra reliable and low latency communications (URLLC) service, needs to be transmitted suddenly, or when strong interference is detected, how the base station operates to satisfy the service requirements should be considered. For another example, in the process of sending downlink data or sending the discovery reference signal (DRS) in consecutive slots, a sudden uplink scheduling request requires the base station to immediately allocate an uplink resource to the UE for sending a service data packet with a higher priority. How to perform scheduling, how to notify the UE, and how to process the HARQ of corresponding scheduled data by the base station should be considered. Therefore, the implementation of flexible duplex and relevant signaling design corresponding to different service requirements, as well as its impact on scheduling and subsequent HARQ should be considered.

The present invention will be described in detail below in conjunction with the drawings and examples.

Figure 1A:
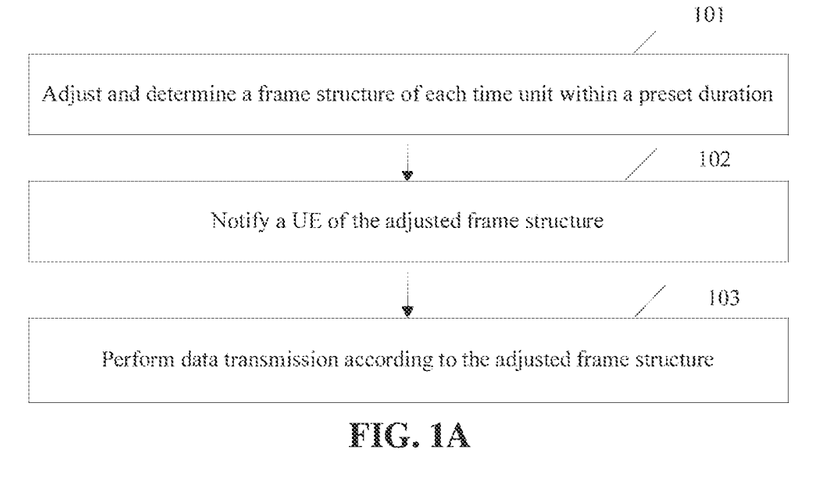
FIG. 1A is a flowchart 1 of a data transmission method according to an embodiment of the present invention.

A data transmission method is provided in the present invention. As shown in FIG. 1A, the method includes steps described below.

In step 101, a frame structure of each time unit within a preset duration is adjusted and determined.

In step 102, the adjusted frame structure is notified to a UE.

In step 103, data transmission is performed according to the adjusted frame structure.

One aspect of the present invention is how to implement flexible duplex or dynamic TDD, how to determine uplink and downlink configuration and how to perform indication.

First, the uplink and downlink configuration is adjusted and determined by using at least one of:

a priority level of a data service;
a priority level of a channel, a signal or a link;
a sensing result of a carrier;
negotiation between adjacent cells; and
a capability of the UE.

The each configured time unit includes one of: a subframe, a slot, a mini-slot, and the number m of orthogonal frequency division multiplexing (OFDM) symbols. Here, m is an integer greater than or equal to 1.

The step of notifying the UE of the adjusted frame structure includes at least one of: indicating the adjusted frame structure through physical layer signaling;
configuring the adjusted frame structure through higher-layer signaling; and
notifying the adjusted frame structure through multicast signaling or a system message.

For example, the base station notifies the UE of the uplink and downlink configuration or further a blank resource through at least one of: a system information block (SIB), a physical broadcast channel (PBCH), radio resource control (RRC), and dynamic physical layer signaling such as DCI. The blank resource represents a resource at least being not used for transmitting data information.

The step in which the frame structure is adjusted includes steps described below.

A first number of slots or mini-slots or OFDM symbols are configured for uplink transmission of uplink preset information. The uplink preset information includes at least one of: an uplink acknowledgement (ACK)/negative-acknowledgement (NACK), a scheduling request (SR), a sounding reference signal (SRS), a preamble initial access, and an uplink retransmitted data packet.

A second number of slots or mini-slots or OFDM symbols are configured for downlink transmission of downlink preset information. The downlink preset information includes at least one of: a downlink control channel, a synchronization channel, a downlink broadcast channel, and a discovery reference signal (DRS).

A third number of slots or mini-slots or OFDM symbols are configured as reserved resources or as blank resources. The blank resources represent resources at least being not used for transmitting data information.

That is to say, the semi-static and dynamic signaling indication adopts least one of the following manners.

Manner 1:

Two adjacent base stations negotiate and then semi-statically configure certain time domain positions for transmission of downlink or uplink important information. For example, certain slots or OFDM symbols are configured for transmission of an uplink ACK/NACK, an SR, an SRS, a preamble initial access or a retransmitted data packet. Certain slots or OFDM symbols are configured for transmission of a downlink control channel, a synchronization channel, a DRS signal or the like. Then, the base station may dynamically indicate remaining time domain resource to be used for uplink, downlink or used as blank resource.

Manner 2:

A ratio set, or a pattern, or a ratio set and a pattern is configured, and an index of the ratio set, or an index of the pattern, or an index of the ratio set and the pattern is indicated through dynamic signaling. Some ratio sets, or some patterns, or some ratio sets and patterns are semi-statically configured, and the index of the ratio sets, or the index of the patterns, or the index of the ratio sets and the patterns is dynamically indicated.

Manner 3:

A size of a subframe group/slot group is configured, and uplink and downlink configuration of each subframe/slot in each subframe group/slot group is dynamically indicated. A size of a subframe/slot group is semi-statically configured, and uplink and downlink configuration of each subframe/slot in each subframe/slot group is dynamically indicated.

The uplink grant information includes information of a time domain position at which uplink data transmission is scheduled, and the downlink grant information includes information of a time domain position at which downlink data transmission is scheduled.

The base station performs the above dynamic indication further in the following included manners. An uplink time domain position is determined according to uplink grant information for scheduling uplink data; and a downlink time domain position is determined according to downlink grant information for scheduling downlink data.

Uplink and downlink configuration information of subsequent k slots or m mini-slots is indicated or the subsequent k slots or m mini-slots are indicated as blank resources through downlink control information born in a common search space of a downlink control channel.

Manner 1: A time domain position of uplink data is implicitly determined according to uplink grant information for scheduling the uplink data; and a time domain position of downlink data is implicitly determined according to downlink grant information for scheduling the downlink data.

Manner 2: Uplink and downlink attribute of subsequent k slots or mini-slots are indicated or a certain slot is indicated as a blank resource, and an attribute of each OFDM symbol in a mixed slot is indicated through downlink control information born in a common search space of a downlink control channel.

The common control information is sent in a control area of a predefined or configured downlink time unit or is sent in each downlink time unit.

Manner 3: A change of an uplink and downlink configuration attribute of a subsequent t-th slot or s-th mini-slot is indicated or the subsequent t-th slot or s-th mini-slot is indicated as a blank resource through specific downlink control information born in a specific search space of the downlink control channel, where t and s are positive integers.

In particular, for the structure of the mixed slot including both uplink and downlink, a secondary indication is used for determining each symbol to be uplink or downlink or the blank resource.

First-level DCI indicates the length of each mini-slot, and second-level DCI indicates the uplink and downlink or the blank resource of each mini-slot.

In particular, for the carrier aggregation scenario, the method of dynamically adjusting uplink and downlink configuration is applicable to all cells, and uplink and downlink configuration indication information of a secondary cell (Scell) is sent on a downlink control channel of a primary cell (Pcell), or is sent only on a downlink control of the S cell.

For the dual-link scenario, the uplink and downlink configuration indication information of the Scell may also be sent on a downlink control channel of a primary secondary cell (PScell).

Another aspect of the present invention is how to treat with impact on scheduling and HARQ, and steps described below may be included.

A slot n or a mini-slot in the slot n for downlink data transmission is adjusted to be the slot n or the mini-slot in the slot n for uplink data transmission.

A slot m or a mini-slot in the slot m for the uplink data transmission is adjusted to be the slot m or the mini-slot in the slot m for the downlink data transmission.

The slot n or the mini-slot in the slot n for the downlink data transmission is adjusted to be a blank resource.

The slot m or the mini-slot in the slot m for the uplink data transmission is adjusted to be the blank resource.

For example, since the slot n or a certain mini-slot in the slot n is temporarily and dynamically adjusted for sending a service having a high priority level in the uplink or adjusted for coordinating interference between adjacent cells, a certain downlink data packet scheduled to be originally transmitted in the slot n or the certain mini-slot in the slot n may be processed in one of the following manners.

A data packet originally sent in the slot n or the mini-slot in the slot n is discarded, and the data packet being corrupted is indicated to a terminal, where scheduling is not counted in the number of retransmissions; or a data packet originally sent in the slot m or the mini-slot in the slot m is discarded, and the data packet being corrupted is indicated to the terminal, where scheduling is not counted in the number of retransmissions.

The data packet to be originally sent in the slot n or the mini-slot in the slot n and the data packet to be originally sent in the slot m or the mini-slot in the slot m are sent in a manner of reduced power or a reduced modulation coding scheme (MCS).

The data packet to be originally sent in the slot n or the mini-slot in the slot n, or the data packet to be originally sent in the slot m or the mini-slot in the slot m is rescheduled to another resource; or the data packet to be originally sent in the slot n or the mini-slot in the slot n and the data packet to be originally sent in the slot m or the mini-slot in the slot m are rescheduled to another resource for transmission.

The data packet to be originally sent in the slot n or the mini-slot in the slot n, or the data packet to be originally sent in the slot m or the mini-slot in the slot m is sent on a reserved resource; or the data packet to be originally sent in the slot n or the mini-slot in the slot n and the data packet to be originally sent in the slot m or the mini-slot in the slot m are sent on the reserved resource. The above-mentioned reserved resource and another resource may substantially be time domain resources, or frequency domain resources, or time domain resources and frequency domain resources, and another resource and the reserved resource may refer to different resource positions respectively.

That is to say, in a method 1, the data originally sent at the position is directly discarded, and the terminal is indicated that the data packet is corrupted, thereby avoiding the influence of retransmission and merging. ACK/NACK is not fed back and scheduling is not counted in the number of retransmissions.

In a method 2, the data packet is still sent with reduced power or with a low MCS.

In a method 3, the data packet is rescheduled to another time domain position, or another frequency domain position, or another carrier.

The feedback of ACK/NACK may be processed as described below.

When the re-indicated data transmission position is located later than the original position of the ACK/NACK feedback, the DCI information also includes new resource position information of the ACK/NACK feedback corresponding to the data packet, and the new position of the data packet and the corresponding position of the ACK/NACK are indicated in a manner of joint coding.

Manner 4: The base station sends the data packet on some reserved downlink resources.

Since the slot m or a certain mini-slot in the slot m is temporarily and dynamically adjusted for sending a service having a high priority level in the uplink or adjusted for coordinating interference between adjacent cells, a certain uplink data packet scheduled to be originally transmitted in the slot m or the certain mini-slot in the slot m may be processed in one of the following manners.

Transmission of the data packet originally transmitted in the slot is directly relinquished.

The UE continues to blindly detect DCI indication information for triggering transmission. After the indication information for triggering transmission is detected again, the UE sends the prepared data packet at the indicated position again.

A timer is set. When new trigger information is received within the time interval set by the timer, transmission is performed according to the indication information. When no new trigger information is received within the time interval set by the timer, the data packet is discarded.

Other time-frequency resources includes: a physical resource block (PRB) position or a new slot position, or further includes a codebook or an orthogonal code resource. For example, trigger transmission signaling that indicates a new scheduling position is sent to the UE originally scheduled at the position. The new scheduling position includes a new PRB position or a new slot position or further includes a codebook or an orthogonal code resource.

The UE sends the data packet on some reserved uplink resources.

The treatment with impacts on scheduling and HARQ timing includes steps described below.

For the scenario of semi-static configuration scheduling and feedback timing, the subframe for data transmission is determined according to the reference subframe configuration and the configured timing value; or the original semi-static configuration timing is switched to dynamic indication timing; and for dynamic signaling indication timing, the timing indication is re-modified.

In addition, different subbands in a bandwidth are configured to have different uplink and downlink configurations, and when adjacent two subbands have different uplink and downlink configurations, a guardband is provided between the adjacent two subbands.

Different subbands in a large bandwidth may be configured to have different uplink and downlink configurations. When adjacent two subbands have different uplink and downlink configurations, a guardband may be provided between the adjacent two subbands to avoid adjacent frequency interference. The base station notifies the UE of the uplink and downlink configurations of different subbands in a time-frequency two-dimensional manner.

Preambles of certain signals/channels such as discovery reference signals (DRSs)/random access channels are sent in a transmission window, and transmission positions of these signals may be dynamically adjusted for transmission of a service having a high priority level.

A data transmission method is further provided in the present invention, and is applied to a UE.

Figure 1B:
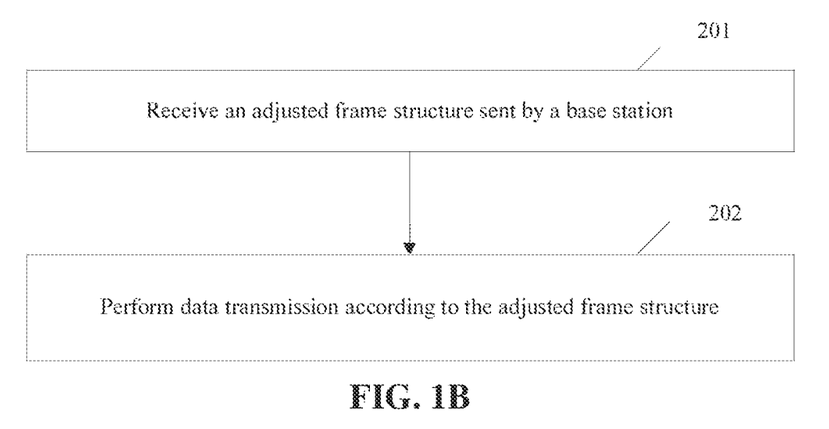
FIG. 1B is a flowchart 2 of a data transmission method according to an embodiment of the present invention.

As shown in FIG. 1B, the method includes steps described below.

In step 201, an adjusted frame structure sent by a base station is received.

In step 202, data transmission is performed according to the adjusted frame structure.

After the adjusted uplink and downlink configuration information or frame structure sent by the base station is received, the method further includes the step described below.

When the UE determines a change of uplink and downlink configuration information in a time unit corresponding to the uplink and downlink configuration information or the frame structure according to the uplink and downlink configuration information or the frame structure, an originally scheduled data packet is processed as follows.

The UE blindly detects new scheduling information of the base station within predefined time. The new scheduling information is scrambled by using a specific identifier. The new scheduling information indicates that the originally scheduled data packet is rescheduled to another time domain position, another frequency domain position, another carrier, another codebook, or another orthogonal code resource.

When control information of the rescheduling has not been detected within the predefined time, the UE relinquishes sending or receiving of the data packet, or the UE sends or receives the data packet on some reserved resources.

Based on the above, the present invention provides the following examples.

Example 1

The example describes in detail how the base station notifies the UE subject thereto of the link direction, or the uplink/downlink/blank resource attribute.

The base station notifies the UE of the uplink and downlink configuration by using at least one of the following information: an SIB, a PBCH, a RRC, and dynamic physical layer signaling such as DCI.

For example, the uplink and downlink attribute at a certain moment is determined in one of the following manners.

Manner 1: The system specifies certain fixed time domain positions such as certain fixed slots or OFDM symbols for sending the uplink ACK/NACK, SR, SRS or preamble initial access or retransmitted data packet.

For example, a slot 1 is used for sending the SR, the last OFDM symbol of a slot 4 is used for sending the SRS, and a slot 5 is used for sending a message 1 or a preamble signal in a random access process. The last OFDM symbol of a slot 8 is used for sending the ACK/NACK.

Meanwhile, certain slots or OFDM symbols are fixedly used for sending certain downlink data or information.

For example, the first OFDM symbol of a slot 0 is fixedly used for sending the downlink control channel, the slot 4 is used for sending the downlink synchronization channel, and a slot 7 is used for sending the DRS.

The base station may then dynamically indicate whether the remaining resources other than the fixed resources are uplink or downlink or blank resources.

Manner 2: Two adjacent base stations negotiate and then semi-statically configure certain time domain positions for transmitting downlink data or uplink data.

For example, a cell 1 and a cell 2 are two adjacent cells. When the two adjacent cells belong to the same base station, the base station may semi-statically configure, through higher-layer signaling according to requirements, certain time domain resources for transmitting uplink data or downlink data.

When the two adjacent cells belong to different base stations, the two base stations may exchange information via an air interface, and then notify the UE in the cells through the higher-layer signaling of the negotiated uplink and downlink attribute of the time domain position.

For example, the adjacent base stations negotiate and determine that in the adjacent two cells, the slot 1 is used for sending the SR, the last OFDM symbol of the slot 4 is used for sending the SRS, and the slot 5 is used for sending the message 1 or the preamble signal in the random access process. The last OFDM symbol of the slot 8 is used for sending the ACK/NACK. The first OFDM symbol of the slot 0 is used for sending the downlink control channel, the slot 4 is used for sending the downlink synchronization channel, and the slot 7 is used for sending the DRS.

Then, the base station dynamically adjusts or configures the remaining time domain resources according to the uplink and downlink service requirements.

Manner 3: All resources are dynamically indicated by the base station.

Manner 4: A part of the resources are fixedly used for uplink data transmission or downlink data transmission, and a part of the resources are semi-statically configured for uplink data transmission or downlink data transmission or as blank resources, and a part of the resources are used for dynamically indicating uplink data transmission or downlink data transmission or blank resources.

The base station performs the above dynamic indication further in the following included manners.

Manner 1: A time domain position of uplink data is implicitly determined according to uplink grant information for scheduling the uplink data; and a time domain position of downlink data is implicitly determined according to downlink grant information for scheduling the downlink data.

That is, uplink data is scheduled to the time domain position for uplink data transmission, and downlink data is scheduled to the time domain position for downlink data transmission.

The uplink grant information and the downlink grant information are born in a specific search space of the downlink control channel. The downlink control channel is located on the first few OFDM symbols of certain slots that are semi-statically configured or fixed.

Manner 2: Signaling notification is displayed through common control information.

For example, downlink control information is carried in a common search space of the downlink control channel to indicate uplink and downlink attribute of subsequent k slots or mini-slots or to indicate a certain slot as a blank resource, and an attribute of each OFDM symbol in a mixed slot.

For example, the bitmap is used for indicating whether the subsequent k slots or mini-slots have uplink attribute or downlink attribute. 0 represents the uplink and 1 represents the downlink. Or inversion represents a change of the uplink and downlink attribute of the slot or the mini-slot. No inversion represents no change of the uplink and downlink attribute of the slot or the mini-slot. If a bit corresponding to a slot changes from 0 to 1, it means that the uplink and downlink attribute is changed. Otherwise it means that the attribute of the slot is not changed.

Manner 3: A slot whose configuration changes is notified through specific control information.

For example, 3 bits or 4 bits in the DCI indicate the slot or the mini-slot whose configuration has changed, and 1 bit indicates a change between uplink and downlink or the resource becoming a blank resource. For example, when the 1 bit is 0, it indicates that the uplink and downlink attribute of the slot or the mini-slot changes, and when the 1 bit is 1, it indicates that the slot or the mini-slot is a blank resource.

Manner 4: Some uplink and downlink frame structure patterns and the granularity of slot allocation changed by the base station are predefined or semi-statically configured through higher-layer signaling, and then the base station dynamically indicates indexes of the patterns.

For example, a size of the slot group is semi-statically configured to be 4, and then the uplink and downlink configuration of every 4 slots is notified through dynamic DCI signaling. The notification may also be in a manner of notifying the index of the uplink-downlink ratio. As listed in Table 1 below, each ratio index corresponds to an uplink-downlink ratio. Configuration of each slot is determined by one-to-one correspondence in the order of first the downlink slot and then the uplink slot. What is missing is a blank slot. If both uplink and downlink slots exist, the blank slot is located between the downlink slot and the uplink slot.

TABLE 1

| Index | Signaling | Corresponding uplink-downlink ratio |
| --- | --- | --- |
| 1 | 000 | 0:4 |
| 2 | 001 | 1:3 |
| 3 | 010 | 2:2 |
| 4 | 011 | 3:1 |
| 5 | 100 | 4:0 |
| 6 | 101 | 3:0 |
| 7 | 110 | 0:3 |
| 8 | 111 | 2:1 |

The UE determines the receiving or transceiving of data or the reservation of resources at each time moment by receiving the above information.

Through the above method, the UE can accurately know the direction of data transmission, so as to correctly receive or transmit data.

Example 2

The example describes in detail the situation in which the uplink and downlink configuration in the frame structure is dynamically changed.

The uplink and downlink configuration in the frame structure includes reserving or configuring some blank resources.

In addition to a dynamical change of the uplink and downlink attribute of a subframe or a slot or a mini-slot or several OFDM symbols, the base station may also dynamically indicate some blank resources and instruct the UE not to send any data on the blank resources during the data transmission.

These blank resources include n consecutive PRBs for the frequency domain, and include one or more slots or one or more OFDM symbols within a slot for the time domain. For example, the base station indicates, through the bitmap, in the common control information DCI of the first OFDM symbol of a slot which ones or which one of the remaining six OFDM symbols among the seven OFDM symbols included in the slot are reserved.

The reserved or blank resource positions are used for at least one of the following.

The UE does not receive data at the reserved position.

The reserved or blank resource positions are used for a site to sense and listen for interference.

The reserved or blank resource positions are used for dynamic adjustment of receiving and sending.

The reserved or blank resource positions coexist with the traditional system.

Some resources are reserved for sending data packets that are not sent.

The reserved or blank resource positions are used for sending multicast services.

The position of the blank symbol may also be semi-statically configured through higher-layer signaling, with the frequency domain position occupying a part of the bandwidth.

The position of the blank symbol may be located between transmissions of uplink data and downlink data or between two mini-slots.

The requirements of the system for forward compatibility and flexible adjustment of resources are satisfied by configuring these blank resources.

The step in which the base station notifies the uplink and downlink configuration further includes: semi-statically configuring a size of a slot group, and then indicating uplink and downlink configuration in each slot group through dynamic signaling.

Figure 2A:
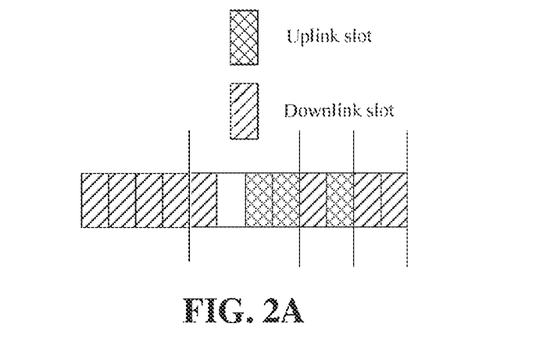
FIG. 2A is a schematic diagram 1 of resource allocation according to an embodiment of the present invention.

As shown in FIG. 2A, the size of a slot group initially configured by the base station is 4 slots. Then, the dynamic DCI indicates that the uplink-downlink ratio in the first slot group is 0:4, and the predefined arrangement sequence is first the downlink slot and then the uplink slot. It means that the first slot to the fourth slot are all downlink. For another example, the DCI indicates that the uplink-downlink ratio in the second slot group is 2:1, and then among the four slots, the first slot is downlink, the second slot is blank, and the third and fourth slots are uplink. Then, the size of the slot group is semi-statically changed to be 2 slots through the higher-layer signaling. And the uplink-downlink ratio in the first slot group is indicated to be 1:1 through the dynamic signaling, which means that the first slot is downlink and the second slot is uplink. Then, the uplink-downlink ratio in the second slot group is 2:0, which means that the first slot is downlink, and the second slot is also downlink.

The signaling overhead can be reduced in this indication manner.

Example 3

The example describes the granularity and adjustment of dynamic TDD.

The base station determines the uplink and downlink attribute at a certain moment by using at least one of the followings.

A priority level of a data service is used. A service having a high priority level is sent first, a corresponding uplink and downlink attribute is configured to the data packet, and the final link direction of two data packets having the same service priority level and different directions is determined through contention.

A priority level of a channel or a signal is used. Different channels and signals are divided into different priority levels through predefinition. A channel or signal having a high priority level are sent first, and then the base station broadcasts the corresponding uplink and downlink attribute. A channel or signal having a low priority level is delayed to be sent.

A sensing result of a carrier is used. Uplink and downlink data transmission is determined according to a contention result of the carrier.

A result of negotiation between adjacent cells is used. If an adjacent cell performs a high-priority-level downlink data transmission at a certain moment, the current cell should also be configured to perform downlink data transmission in order to avoid cross-link interference.

A capability of the UE is used.

The granularity of dynamical change of slot allocation of uplink and downlink includes: the granularity of a subframe (1 ms), the granularity of a slot, the granularity of a mini-slot, or the granularity of n OFDM symbols, where n is semi-statically configured or indicated through dynamic signaling.

Figure 2B:
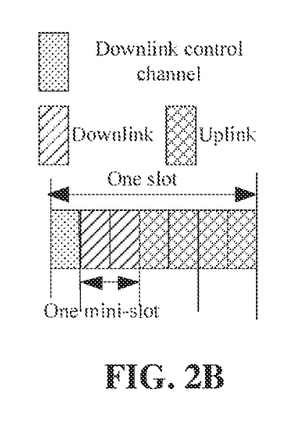
FIG. 2B is a schematic diagram 2 of resource allocation according to an embodiment of the present invention.

For example, it is assumed that the length of the mini-slot is semi-statically configured to be 2 OFDM symbols, and the structure of a certain slot is as shown in FIG. 2B. The length of the slot is 7 OFDM symbols, and the first OFDM symbol is fixedly used for the downlink control channel and includes the uplink and downlink attribute of the subsequent 3 mini-slots. For example, the bitmap is used for indicating to the user equipment that the adjusted frame structure is 011, and then the first mini-slot is indicated to be downlink, and the remaining two mini-slots are indicated to be uplink.

Different subbands in a system bandwidth may be configured to have different uplink and downlink configurations within the same time period. For example, for a subframe, the uplink and downlink configuration of a subband 1 is a configuration pattern 1, the uplink and downlink configuration of a subband 2 is a pattern 2, and the uplink and downlink configuration of a subband 3 is a pattern 3. Meanwhile a guardband is provided between subbands.

In the above manner, the uplink and downlink configurations of different frequency bands in the system bandwidth at different time may be dynamically adjusted.

Example 4

The example describes a situation in which the transmission of uplink data is adjusted to the transmission of downlink data.

Figure 3:
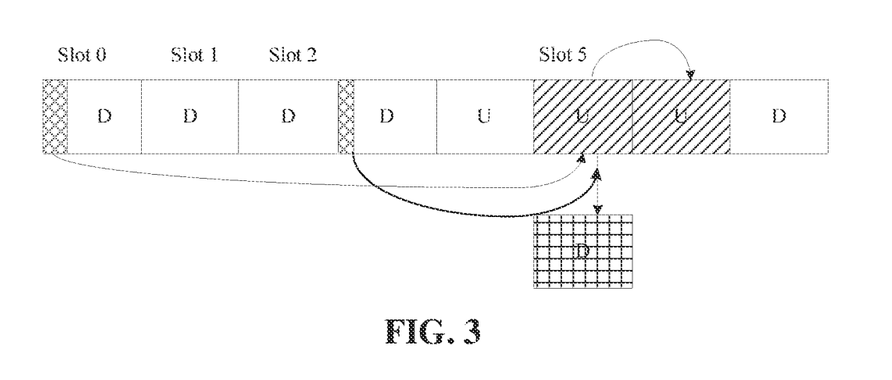
FIG. 3 is a schematic diagram 3 of resource allocation according to an embodiment of the present invention.

The base station sends, in the slot 0, DCI information for continuous scheduling of multiple slots to the UE, and the DCI information is born in the UE-specific search space. For example, as shown in FIG. 3, slots 4, 5 and 6 are continuously scheduled for sending the uplink data packet. While in the slot 2, the base station suddenly has a downlink data packet, such as a URLLC packet, having a high priority level to be sent, and then the base station sends, in the common DCI of the slot 3, signaling for changing uplink and downlink configuration in a slot of a frame structure.

Therefore, the slot 5 is changed to be downlink, and then the base station sends downlink scheduling information to schedule the URLLC data packet to be sent in the slot 5.

After all UEs detect the common indication information, the data packet, of the UE, scheduled in the slot 5 is processed in one of the following manners.

Manner 1: Transmission of the data packet in the slot 5 is relinquished and directly discarded.

Manner 2: The data packet is sent in the slot 5 at a lower power.

Manner 3: The UE continues to blindly detect DCI indication information for triggering transmission. After the indication information for triggering transmission is detected again, the UE sends the prepared data packet at the indicated position again.

For example, the base station sends scheduling update signaling to the UE originally scheduled at the position. The scheduling update signaling indicates a new scheduling position which includes a new PRB position or a new slot position or further includes a codebook or an orthogonal code resource. For example, the data packet originally scheduled in the slot 5 is scheduled to the slot 6 for transmission, and an orthogonal code may be configured at the same time.

Manner 4: The UE sends the data packet on some reserved uplink resources.

The reserved resources are certain fixed resources or certain semi-statically configured resources.

For example, the slot 7 is a reserved slot resource as a new position for transmission of a data packet that is originally scheduled but is not sent.

Then the base station receives the data packet according to the indicated new position or reserved resource position.

This implements data transmission and reception in the case of dynamically adjusting the uplink and downlink configuration.

Example 5

The example describes a situation in which the downlink data transmission process is adjusted to be uplink transmission process.

The base station sends, on the first OFDM symbol of the slot 0, DCI information for continuous scheduling of multiple slots to the UE, and the DCI information is born in the UE-specific search space. For example, as shown in FIG. 3, slots 0, 1, 2 and 3 are continuously scheduled for sending the downlink data packet. While in the slot 1, the base station suddenly receives an uplink scheduling request sent by the UE to require the base station to immediately allocate an uplink resource to the UE for sending a service data packet having a high priority level. For example, the URLLC packet is to be sent, and then the base station sends uplink and downlink change signaling in the common downlink control information of the slot 2, and the slot 2 is changed to be uplink. After the UE receives the common information, the UE that has a service with a high priority level may perform sensing on certain resources of the slot. If the resource is not used, the uplink data may be sent in a grant-free manner. Or the base station simultaneously sends, in the specific search space of the control channel in the slot 2, grant information to the UE that sends the scheduling request, to indicate certain PRB resources of certain OFDM symbols of the slot 2 and scheduling information such as the MCS. For the downlink packet originally scheduled at this position, the base station may perform processing in one of the following manners.

Transmission of the data packet is relinquished, and meanwhile the UE does not receive the scheduled downlink data packet and does not feed back ACK/NACK.

The data packet is still sent at a lower power than the original transmit power.

The data packet is rescheduled to another time domain position, or another frequency domain position, or another carrier.

A timer is set. If the indication information of rescheduling is still not received within the time interval set by the timer, the data packet is discarded.

For example, the base station resends DCI to the UE corresponding to the downlink data packet originally scheduled at the position, and notifies the UE that the original data packet is resent in the slot 4, which may be, for example, an offset of k slots from the original position, where k=2. If the re-indicated position is located later than the original position of the ACK/NACK feedback, the DCI information may include new resource position information of the ACK/NACK feedback corresponding to the data packet.

For example, the transmission position of the ACK/NACK feedback corresponding to the downlink data packet originally indicated in the slot 2 is the last OFDM symbol of the slot 3. Since the data packet of the base station in the slot 2 is not sent, the UE feeds back NACK or nothing in the slot 3.

If the base station re-indicates the position of the ACK/NACK feedback corresponding to the data packet as the slot 5, the UE feeds back the corresponding ACK/NACK in the slot 5 according to the new indication information after the UE receives the data packet in the slot 4.

Or the base station indicates the position of the new data packet and the position of the corresponding ACK/NACK in a manner of joint coding.

The base station sends the data packet on some reserved downlink resources.

The reserved resources are certain fixed resources or certain semi-statically configured resources.

For example, the slot 7 is a reserved slot resource as a new position for transmission of a data packet that is originally scheduled but is not sent.

This implements data transmission, reception and feedback in the case of dynamically adjusting the uplink and downlink configuration.

Example 6

The example describes the process of data scheduling adjustment by the base station in the process of sending the downlink synchronization signal and the measurement signal.

Figure 4:
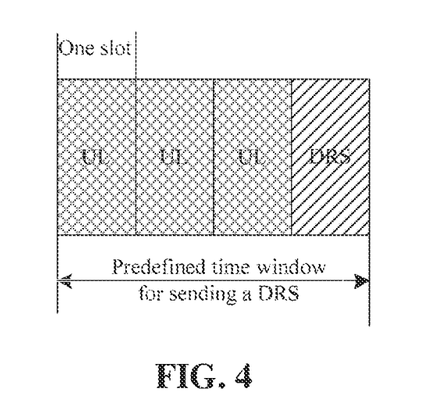
FIG. 4 is a schematic diagram 4 of resource allocation according to an embodiment of the present invention.

For example, the system defines that the downlink synchronization signal and the channel measurement signal may be sent in some predefined time windows. It is assumed that the time window for transmission is 2 ms and includes four slots, that is, these signals may have four possible transmission positions in one transmission period, or may be transmitted in any one of the four slots. The base station may dynamically adjust the transmission position of these signals according to the requirements of the service priority level. As shown in FIG. 4, The base station originally sends a downlink synchronization signal and a channel measurement signal, such as a DRS, in the slot 5, and suddenly an uplink URLLC data packet is to be sent, and then the base station may send common DCI information to notify that all or part of the OFDM symbols of the slot 5 are used for uplink URLLC service. At the same time, the DRS signal is delayed to the next slot for transmission.

For example, the transmission position of a message 1 in the predefined random access process is also some predefined time windows, that is, the system reserves certain resources for transmission of the uplink preamble initial access. If the base station has a downlink service with a high priority level to be sent, the base station may send common DCI information to notify that certain reserved resources are used for transmission of downlink data with the high priority level, and then the UE may perform access on other reserved resources in the time window. Channel sensing measurement is performed before the access.

Example 7

The example describes ACK/NACK of the data packet.

When transmission of uplink and downlink data packets is dynamically changed, the size of the corresponding ACK/NACK playload may also be dynamically changed, and a resource and position of the ACK/NACK feedback may be affected.

For example, if an ACK/NACK of m bits is to be fed back at a certain moment and since an ACK/NACK corresponding to a newly added downlink data packet is also fed back at this moment, the number of bits of the ACK/NACK will increase. Or the base station re-allocates another moment for feeding back the ACK/NACK corresponding to the newly added downlink data packet.

A feedback resource of the ACK/NACK corresponding to the downlink data is determined in at least one of the following manners.

The last OFDM symbol or the first OFDM symbol of each of certain slots is semi-statically configured as a resource for the uplink ACK/NACK.

For example, a slot includes 14 OFDM symbols, the base station originally and continuously schedules m data packets in a scheduling unit of k (k may be 1, 2 or 4) OFDM symbols, and the ACK/NACK feedback of the m data packets are all performed in the slot.

When the length of the uplink control channel bearing the ACK/NACK is one slot, the resource is determined in one of the following manners.

Manner 1: A position of the ACK/NACK corresponding to the data packet is implicitly determined through a position of DCI corresponding to the scheduled downlink data packet.

Manner 2: The base station semi-statically configures a resource set through higher-layer signaling, and then indicates the time-frequency resource through dynamic signaling.

In addition, when the size of the ACK/NACK payload is dynamically changed, the resource may be determined in the following manner. Two resource positions are configured by the higher-layer and a threshold is predefined. When the size of the ACK/NACK payload is greater than the threshold, the ACK/NACK is sent at a resource position 1 or sent on a long physical uplink control channel (PUCCH). When the size of the ACK/NACK payload is less than the threshold, the ACK/NACK is sent at a resource position 2 or sent on a short PUCCH.

Example 8

The example describes the situation in which the URLLC service and the enhanced mobile broadband (eMBB) service are multiplexed and transmitted.

It is assumed that the base station sends downlink control information to a UE1 on the first OFDM symbol of the slot 1 to schedule a downlink eMBB service for data transmission in slots 1, 2, 3 and 4 continuously. A UE2 suddenly has an uplink URLLC service to be scheduled in the slot 2, and then the base station sends DCI information to the UE2 in the slot 3 to schedule transmission of the uplink URLLC data packet. Meanwhile the base station removes all eMBB data packets originally intended to be sent in the slot 3, and sends control information to the UE1 on the last OFDM symbol of the slot 4 to notify that the eMBB data packet in the slot 3 is corrupted. The UE1 may then perform interference cancellation reception on the corrupted data after the UE1 receive the control information.

Through the displayed signaling, retransmission of the entire eMBB data packet is avoided, and the spectrum efficiency is improved.

Example 9

The example is directed to an impact of a dynamic change of uplink and downlink on scheduling and HARQ timing.

It is assumed that the base station sends downlink control information in the slot n to schedule four downlink slots from slot (n+1) to slot (n+4) for downlink data transmission, and meanwhile indicates through dynamic signaling that the ACK/NACK corresponding to a data packet born in each slot is fed back in a slot (n+5). The adjacent cell or the current cell has uplink data with a high priority level to be sent in the slot (n+4), so in order to ensure the performance of the data packet with the high priority level, the base station temporarily sends common DCI information to notify that the slot (n+4) is the uplink subframe. After the information is received, the UE managed by the base station does not receive downlink data in the slot (n+4). The ACK/NACK is not fed back for the downlink data packet originally scheduled at the position, where data transmission of the scheduling is not counted in the maximum number of retransmissions. If new DCI information is received within the time interval set by the timer, the data packet is received according to the new indicated position, and the ACK/NACK is fed back at the corresponding position according to the indication information.

Example 10

The example describes the process of URLLC scheduling and data transmission.

The URLLC service may be accessed in a scheduling-based manner or in a schedule-free manner. When reception of the initial transmission has an error and in order to reduce the delay, a retransmitted data packet of the UE is accessed in the schedule-free manner, or the UE performs access in the scheduling-based manner, and the indicated transmission timing is symbol-level. For example, the URLLC is scheduled in units of 1 OFDM symbol, and the scheduling interval of two adjacent scheduling is very small and is one or two OFDM symbols. The process of scheduling access may be that: the base station sends downlink DCI on the third symbol of the slot 0 to notify the UE of transmission on a symbol 6 of the retransmitted data packet originally accessed in the scheduling-free manner. The resource is notified by the base station through common DCI. After the DCI is received, all UEs will not send uplink data on the resource. The resource is a resource specific for scheduling retransmitted data packets, and will not be occupied by other UEs.

In addition, for the schedule-free UE, when the initial transmission error occurs or when the UE does not receive the ACK of the base station within predefined time, the UE may perform retransmission according to the predefined frequency-hopping pattern. The frequency-hopping pattern is separated by k OFDM symbols in the time domain. k is less than a predefined threshold. A random frequency domain position is used.

Or the UE uses a different orthogonal code for each automatic transmission.

Or the base station allocates a frequency-hopping pattern of an automatic retransmission when rescheduling is performed.

The above method is used to meet the requirements of low-delay services.

Example 11

The example describes the processing flow of the method, applied to the base station side, provided by the present invention.

As shown in FIG. 4, first the base station determines an uplink-downlink ratio in a certain cell through negotiation with an adjacent site and according to its own uplink and downlink service requirements.

If a data packet having a high priority is to be sent in a cell 1 at a certain moment, the uplink and downlink attribute of the two cells is determined by the data packet. If the data packet is an uplink data packet, uplink data transmission is performed in both the two adjacent cells at the moment.

If the data packet is a downlink data packet, downlink data transmission is performed in both the two cells at the moment.

Figure 5:
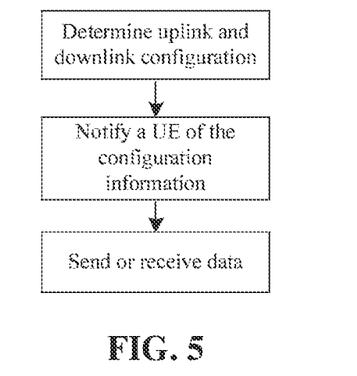
FIG. 5 is a flowchart 3 of a data transmission method according to an embodiment of the present invention.

The processing flow on the base station side corresponding to the example is described in conjunction with FIG. 5. When an uplink data packet and a downlink data packet have the same priority level, the uplink and downlink attribute at the moment is determined through contention.

Then, the base station notifies the UE subject thereto of the determined uplink-downlink ratio.

The notification method includes higher-layer signaling, or dynamic physical layer control signaling, or higher-layer signaling and dynamic physical layer control signaling.

Then, downlink data is sent and uplink data is received according to the uplink and downlink positions.

During the process, the base station temporarily adjusts the uplink and downlink attribute or the blank resource at a certain moment according to the service requirements or the measured interference status.

Example 12

The example describes the processing flow of the method, applied to the terminal side, provided by the present invention.

Figure 6:
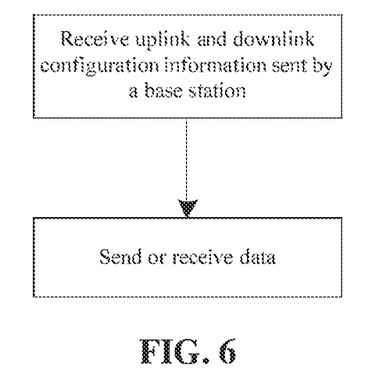
FIG. 6 is a flowchart 4 of a data transmission method according to an embodiment of the present invention.

As shown in FIG. 6, first the terminal receives relevant information about the uplink and downlink configuration sent by the base station.

Then the terminal sends or receives data according to the configuration information.

The base station described in the present invention includes a Node B, an evolved base station (eNode B), a home Node B, a relay node (RN), a macro base station, a micro base station, and the like.

Figure 7A:
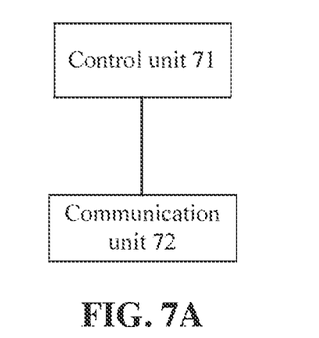
FIG. 7A is a structural diagram of a base station according to an embodiment of the present invention.

Based on the above description, a base station is further provided in the present invention. As shown in FIG. 7A, the base station includes a control unit 71 and a communication unit 72.

The control unit 71 is configured to adjust and determine a frame structure of each time unit within a preset duration.

The communication unit 72 is configured to notify a UE of the adjusted frame structure; and perform data transmission according to the adjusted frame structure.

The each time unit includes one of: a subframe, a slot, a mini-slot, and the number m of OFDM symbols. m is an integer greater than or equal to 1.

The control unit is configured to notify the UE of the uplink and downlink configuration information or the frame structure by using at least one of:
 indicating through physical layer signaling;
 configuring through higher-layer signaling; and notifying
  through multicast signaling or a system message.

The control unit is configured to adjust and determine the uplink and downlink configuration through at least one of the followings:
 a priority level of a data service;
 a priority level of a channel, a signal or a link;
 a sensing result of a carrier;
 negotiation between adjacent cells; and
 a capability of the UE.

The adjusted frame structure includes structures described below.

A first number of slots or OFDM symbols are configured for uplink transmission of uplink preset information. The uplink preset information includes at least one of: an ACK/NACK, an SR, an SRS, a preamble initial access, and an uplink retransmitted data packet.

A second number of slots or OFDM symbols are configured for downlink transmission of downlink preset information. The downlink preset information includes at least one of: a downlink control channel, a synchronization channel, and a DRS.

A third number of slots or mini-slots or OFDM symbols are configured as reserved resources or as blank resources. The blank resources represent resources at least being not used for transmitting data information.

The control unit is configured to perform at least one of following operations.

A ratio set, or a pattern, or a ratio set and a pattern is configured, and an index of the ratio set, or an index of the pattern, or an index of the ratio set and the pattern through dynamic signaling is indicated.

A size of a subframe group/slot group is configured, and uplink and downlink configuration of each subframe/slot in each subframe group/slot group is dynamically indicated.

The indication through physical layer signaling includes steps described below.

An uplink time domain position is determined according to uplink grant information for scheduling uplink data; and a downlink time domain position is determined according to downlink grant information for scheduling downlink data.

Uplink and downlink configuration information of subsequent k slots or m mini-slots is indicated or the subsequent k slots or m mini-slots are indicated as blank resources through downlink control information born in a common search space of a downlink control channel.

A slot n or a mini-slot in the slot n for downlink data transmission is adjusted to be the slot n or the mini-slot in the slot n for uplink data transmission.

A slot m or a mini-slot in the slot m for the uplink data transmission is adjusted to be the slot m or the mini-slot in the slot m for the downlink data transmission.

The control unit is configured to perform one of following operations.

A data packet originally sent in the slot n or the mini-slot in the slot n is discarded, and the data packet being corrupted is indicated to a terminal, where scheduling is not counted in the number of retransmissions; or the data packet originally sent in the slot m or the mini-slot in the slot m is discarded, and the data packet being corrupted is indicated to the terminal, where scheduling is not counted in the number of retransmissions.

The data packet to be originally sent in the slot n or the mini-slot in the slot n, and the data packet to be originally sent in the slot m or the mini-slot in the slot m are sent in a manner of reduced power or a reduced MCS.

The data packet to be originally sent in the slot n or the mini-slot in the slot n and the data packet to be originally sent in the slot m or the mini-slot in the slot m are rescheduled to another time-frequency resource.

The data packet to be originally sent in the slot n or the mini-slot in the slot n and the data packet to be originally sent in the slot m or the mini-slot in the slot m are sent on the reserved resource. Another time-frequency resource includes: a PRB position or a new slot position, or further includes a codebook or an orthogonal code resource.

The uplink and downlink configuration further includes a step described below.

Different subbands in a bandwidth are configured to have different uplink and downlink configurations, where when adjacent two subbands have the different uplink and downlink configurations, a guardband is provided between the adjacent two subbands.

The control unit is further configured to perform operations described below.

A signal/channel of a preset type is sent in a specified window.

When a signal/channel having a higher priority level than the signal/channel of the preset type is sent, the signal/channel having the higher priority level than the signal/channel of the preset type is sent in the specified window.

Figure 7B:
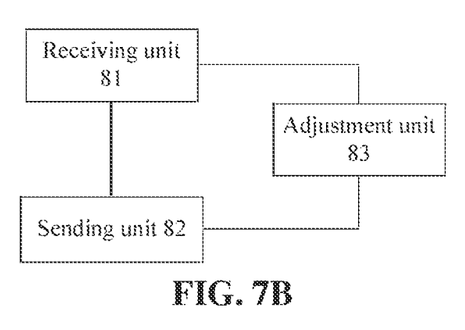
FIG. 7B is a structural diagram of a user equipment according to an embodiment of the present invention.

In addition, a UE is further provided. As shown in FIG. 7B, the UE includes a receiving unit 81 and a sending unit 82.

The receiving unit 81 is configured to receive adjusted uplink and downlink configuration information or an adjusted frame structure sent by a base station.

The sending unit 82 is configured to perform data transmission according to the adjusted frame structure.

The UE further includes an adjustment unit 83.

The adjustment unit 83 is configured to: when a change of uplink and downlink configuration information in a time unit corresponding to the uplink and downlink configuration information or the frame structure is determined according to the uplink and downlink configuration information or the frame structure, an originally scheduled data packet is processed as follows.

New scheduling information of the base station is blindly detected within predefined time.

The new scheduling information is scrambled by using a specific identifier. The new scheduling information indicates that the originally scheduled data packet is rescheduled to another time domain position, another frequency domain position, or another carrier.

When control information of the rescheduling has not been detected within the predefined time, the UE relinquishes sending or receiving of the data packet, or the UE sends or receives the data packet on some reserved resources.

Figure 7C:
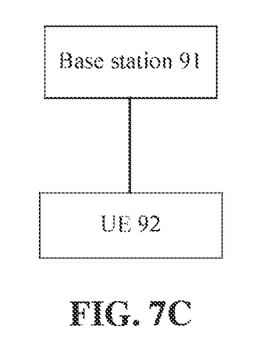
FIG. 7C is a structural diagram of a system according to an embodiment of the present invention.

An indication system is further provided in the present invention. As shown in FIG. 7C, the system includes a base station 91 and a UE 92.

The base station 91 is configured to adjust and determine a frame structure of each time unit within a preset duration, notify a UE of the adjusted frame structure, and perform data transmission according to the adjusted frame structure.

The UE 92 is configured to receive the adjusted uplink and downlink configuration information or frame structure sent by the base station, and perform the data transmission according to the adjusted uplink and downlink configuration information or frame structure.

A base station provided in the present invention includes a storage medium and a processor.

The storage medium includes a group of instructions that, when executed, cause at least one processor to perform the included operations described below.

A frame structure of each time unit within a preset duration is adjusted and determined.

The adjusted frame structure is notified to a UE.

Data transmission is performed according to the adjusted frame structure.

A UE provided in the present invention includes a storage medium and a processor. The storage medium includes a group of instructions that, when executed, cause at least one processor to perform the included operations described below. An adjusted frame structure sent by a base station is received, and data transmission is performed according to the adjusted frame structure.

A computer-readable storage medium is further provided in the embodiments of the present invention, and is configured to store computer-executable instructions which, when executed by a processor, implement any one of the above-mentioned methods.

It should be understood by those skilled in the art that functional modules/units in all or part of the steps of the method, the system and the device disclosed above may be implemented as software, firmware, hardware and appropriate combinations thereof. In the hardware implementation, division of the functional modules/units mentioned in the above description may not correspond to division of physical components. For example, one physical component may have several functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disc storage, a magnetic cassette, a magnetic tape, a magnetic disk storage or other magnetic storage devices, or any other medium used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium.

The above are only exemplary embodiments of the present invention and are not intended to limit the scope of the present invention.

INDUSTRIAL APPLICABILITY

A data transmission method, a base station, a user equipment, and a system are provided in the embodiments of the present invention. The base station side can flexibly adjust the frame structure of each time unit within the preset duration and send the adjusted frame structure to the UE, so that the data transmission can be performed between the base station and the UE according to the adjusted frame structure. Therefore, dynamic uplink and downlink data transmission according to service requirements is implemented.

The invention claimed is:
1. A method for wireless communication, comprising:
transmitting, by a base station, configuration information of a set of slot structures to a user equipment (UE) via a high-layer signaling;

transmitting, by the base station, a data packet to the user equipment using a first slot structure of the set of slot structures;
adjusting, by the base station, the first slot structure to a second slot structure within a preset duration;
notifying, by the base station, the UE that the data packet transmitted using the first slot structure is corrupted; and
rescheduling the data packet to the user equipment using another resource according to the adjusted second slot structure.

2. The method of claim 1, wherein the adjusting the first slot structure to the second slot structure is determined based on a priority level of a channel, a signal, or a link.

3. The method of claim 1, wherein the adjusting the first slot structure to the second slot structure is determined based on a capability of the UE.

4. The method of claim 1, wherein the notifying the UE comprises:
transmitting, by the base station, a physical layer signaling to the UE indicating the adjusted second slot structure.

5. The method of claim 1, wherein the adjusting the first slot structure to the second slot structure comprises
changing an uplink or downlink configuration attribute of subsequent t slots or s mini-slots, wherein t and s are positive integers.

6. A method for wireless communication, comprising:
receiving, by a user equipment (UE), configuration information about a set of slot structures via a high-layer signaling from a base station;
receiving, by the UE, a data packet from the base station using a first slot structure of the set of slot structures;
receiving, by the UE, a notification from the base station indicating that the data packet transmitted using the first slot structure is corrupted; and
receiving the data packet from the base station using a rescheduled resource according to an adjusted second slot structure.

7. The method of claim 6, wherein the method further comprises:
monitoring, by the UE, scheduling information from the base station within a predefined time; and
scrambling, by the UE, the scheduling information using a specific identifier, wherein the scheduling information indicates a time domain position for the data packet.

8. The method of claim 6, wherein receiving the notification comprises:
receiving, by the UE, a physical layer signaling from the base station indicating the adjusted second slot structure.

9. The method of claim 6, wherein an uplink or downlink configuration attribute is adjusted in the second slot structure, and wherein the adjusted second slot structure is applicable to subsequent t slots or s mini-slots, wherein t and s are positive integers.

10. The method of claim 6, wherein the adjusted second slot structure is adjusted based on a capability of the UE, or a priority level of a channel, a signal, or a link.

11. A device for wireless communication, comprising a processor configured to:

transmit configuration information of a set of slot structures to a user equipment (UE) via a high-layer signaling;
transmit a data packet to a user equipment using a first slot structure of the set of slot structures;
adjust the first slot structure to a second slot structure within a preset duration;
notify the UE that the data packet transmitted using the first slot structure is corrupted; and
reschedule the data packet to the user equipment using another resource according to the adjusted second slot structure.

12. The device of claim 11, wherein the processor is configured to adjust the first slot structure to the second slot structure based on a priority level of a channel, a signal, or a link.

13. The device of claim 11, wherein the processor is configured to adjust the first slot structure to the second slot structure based on a capability of the UE.

14. The device of claim 11, wherein the processor is configured to notify the UE by:
transmitting a physical layer signaling to the UE indicating the adjusted second slot structure.

15. The device of claim 11, wherein the processor is configured to adjust the first slot structure to the second slot structure by:
changing an uplink or downlink configuration attribute of subsequent t slots or s mini-slots, wherein t and s are positive integers.

16. A device for wireless communication, comprising a processor configured to:
receive configuration information about a set of slot structures via a high-layer signaling from a base station;
receive a data packet from the base station using a first slot structure of the set of slot structures;
receive a notification from the base station indicating that the data packet transmitted using the first slot structure is corrupted; and
receive the data packet from the base station using a rescheduled resource according to an adjusted second slot structure.

17. The device of claim 16, wherein the processor is configured to:
monitor scheduling information from the base station within a predefined time; and
scramble the scheduling information using a specific identifier, wherein the scheduling information indicates a time domain position for the data packet.

18. The device of claim 16, wherein the processor is configured to receive the notification by:
receiving a physical layer signaling from the base station indicating the adjusted second slot structure.

19. The device of claim 16, wherein an uplink or downlink configuration attribute is adjusted in the second adjusted slot structure, and wherein the adjusted second slot structure is applicable to subsequent t slots or s mini-slots, wherein t and s are positive integers.

20. The device of claim 16, wherein the second slot structure is adjusted based on a capability of the device, or a priority level of a channel, a signal, or a link.

* * * * *